US012780440B2

(12) United States Patent
Ricci et al.

(10) Patent No.: US 12,780,440 B2
(45) Date of Patent: Nov. 3, 2026

(54) POWER MANAGEMENT BETWEEN A HEAT ENGINE AND AN ELECTRIC MACHINE FOR AN AIRCRAFT POWERPLANT

(71) Applicant: Pratt & Whitney Canada Corp., Longueuil (CA)

(72) Inventors: Thomas T. Ricci, Pointe-Claire (CA); Frank Paoletti, Longueuil (CA); Mark Cunningham, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/233,127

(22) Filed: Aug. 11, 2023

(65) Prior Publication Data

US 2025/0051029 A1 Feb. 13, 2025

(51) Int. Cl.
*B64D 35/08* (2025.01)
*F02C 7/36* (2006.01)
*F02C 9/28* (2006.01)

(52) U.S. Cl.
CPC ................ *B64D 35/08* (2013.01); *F02C 7/36* (2013.01); *F02C 9/28* (2013.01); *F05D 2220/323* (2013.01)

(58) Field of Classification Search
None
See application file for complete search history.

(56) References Cited

U.S. PATENT DOCUMENTS

| | | | | |
|---|---|---|---|---|
| 10,633,104 | B2 | 4/2020 | Miller | |
| 10,907,494 | B2 | 2/2021 | Long | |
| 10,953,995 | B2 | 3/2021 | Gansler | |
| 11,053,019 | B2 * | 7/2021 | Mackin | B64D 35/02 |
| 2014/0271117 | A1 * | 9/2014 | Armstrong | F01D 21/12 415/13 |
| 2018/0003071 | A1 * | 1/2018 | Lents | B64D 27/10 |
| 2020/0347743 | A1 * | 11/2020 | Long | F02K 5/00 |
| 2022/0081122 | A1 | 3/2022 | Gazzino | |
| 2022/0275757 | A1 * | 9/2022 | Rambo | F01D 25/12 |
| 2022/0281351 | A1 | 9/2022 | Bartsch | |
| 2023/0021937 | A1 | 1/2023 | Detweiler | |
| 2023/0211887 | A1 * | 7/2023 | Wang | B60L 50/61 244/55 |

OTHER PUBLICATIONS

Andreas Linke-Diesinger, "Systems of Commercial Turbofan Engines," p. 14, © 2008 Springer-Verlag Berlin Heidelberg (Year: 2008).*
EP Search Report for EP Patent Application No. 24194188.9 dated Dec. 16, 2024.

* cited by examiner

*Primary Examiner* — David P. Olynick
(74) *Attorney, Agent, or Firm* — Getz Balich LLC

(57) ABSTRACT

A method of operation is provided during which rotation of a propulsor rotor of an aircraft is driven using mechanical power output from a powerplant. The powerplant includes a heat engine and an electric machine. The heat engine provides a first portion of the mechanical power. The electric machine provides a second portion of the mechanical power. An operational temperature of the heat engine is regulated by controlling the first portion of the mechanical power generated by the heat engine and the second portion of the mechanical power generated by the electric machine.

16 Claims, 4 Drawing Sheets

POWER MANAGEMENT BETWEEN A HEAT ENGINE AND AN ELECTRIC MACHINE FOR AN AIRCRAFT POWERPLANT

TECHNICAL FIELD

This disclosure relates generally to an aircraft and, more particularly, to a propulsion system for the aircraft.

BACKGROUND INFORMATION

An aircraft propulsion system may include a hybrid electric powerplant for driving rotation of a propulsor rotor. Various types of hybrid electric powerplants and various methods for operating hybrid electric powerplants are known in the art. While these known hybrid electric powerplants and methods of operation have various benefits, there is still room in the art for improvement.

SUMMARY

According to an aspect of the present disclosure, a method of operation is provided during which rotation of a propulsor rotor of an aircraft is driven using mechanical power output from a powerplant. The powerplant includes a heat engine and an electric machine. The heat engine provides a first portion of the mechanical power. The electric machine provides a second portion of the mechanical power. An operational temperature of the heat engine is regulated by controlling the first portion of the mechanical power generated by the heat engine and the second portion of the mechanical power generated by the electric machine.

According to another aspect of the present disclosure, another method of operation is provided during which rotation of a propulsor rotor of an aircraft is driven using mechanical power output from a powerplant. The powerplant includes a heat engine and an electric machine. The heat engine provides a first portion of the mechanical power. The electric machine provides a second portion of the mechanical power. A cooling system is operated to dissipate a thermal load generated by and output from the heat engine while providing the first portion of the mechanical power. The first portion of the mechanical power generated by the heat engine and the second portion of the mechanical power generated by the electric machine is controlled based on a cooling capacity of the cooling system.

According to still another aspect of the present disclosure, a system is provided for an aircraft. This system includes a propulsor rotor, a powerplant and a control system. The powerplant is configured to output mechanical power to drive rotation of the propulsor rotor. The powerplant includes a heat engine and an electric machine. The heat engine is configured to provide a first portion of the mechanical power. The electric machine is configured to provide a second portion of the mechanical power. The control system is configured to operate the powerplant to regulate an operational temperature of the heat engine by controlling a ratio of the first portion of the mechanical power generated by the heat engine to the second portion of the mechanical power generated by the electric machine.

The system may also include a cooling system configured to dissipate a thermal load output from the heat engine while providing the first portion of the mechanical power. The cooling system may have a cooling capacity. The control system may also be configured to control the ratio of the first portion of the mechanical power generated by the heat engine to the second portion of the mechanical power generated by the electric machine based on the cooling capacity.

The cooling capacity of the cooling system may increase as a rotational velocity of the propulsor rotor increases.

The cooling capacity of the cooling system may increase as a ground speed and/or an airspeed of the aircraft increases.

A ratio of the first portion of the mechanical power generated by the heat engine to the second portion of the mechanical power generated by the electric machine may be controlled to maintain the thermal load at or below the cooling capacity.

A ratio of the first portion of the mechanical power generated by the heat engine to the second portion of the mechanical power generated by the electric machine may be controlled to regulate an operational temperature of the heat engine.

The regulating of the operational temperature may include: increasing a ratio of the first portion of the mechanical power generated by the heat engine to the second portion of the mechanical power generated by the electric machine to increase the operational temperature; and/or decreasing the ratio of the first portion of the mechanical power generated by the heat engine to the second portion of the mechanical power generated by the electric machine to decrease the operational temperature.

The operational temperature may be regulated to maintain the operational temperature within a temperature range.

The operational temperature may be regulated to maintain the operational temperature below a threshold.

The method may also include cooling the heat engine using a cooling system. The cooling system may receive a thermal load from the heat engine.

The first portion of the mechanical power generated by the heat engine and the second portion of the mechanical power generated by the electric machine may also be controlled to maintain the thermal load at or below a cooling capacity of the cooling system.

The regulating of the operational temperature may be performed while the aircraft is on ground.

The regulating of the operational temperature may be performed while the aircraft is accelerating for takeoff.

The heat engine may be configured as or otherwise include a gas turbine engine.

The heat engine may be configured as or otherwise include a rotary engine.

The heat engine may be configured as or otherwise include a fuel cell.

The propulsor rotor may be configured as or otherwise include an open propulsor rotor.

The propulsor rotor may be configured as or otherwise include a ducted propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
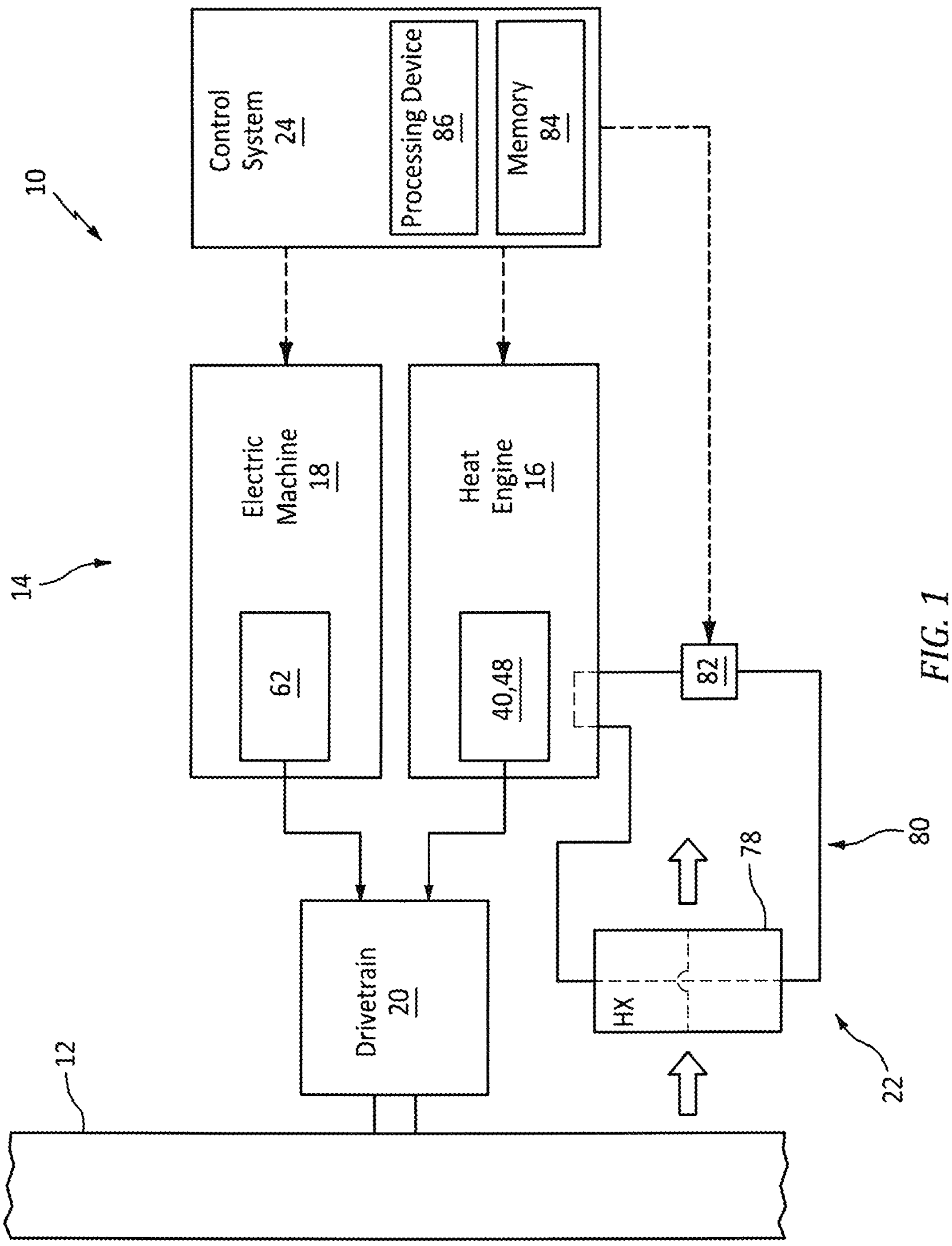
FIG. 1 is a schematic illustration of an aircraft propulsion system.

FIG. 1 illustrates a propulsion system 10 for an aircraft. The aircraft may be an airplane, a helicopter, a drone (e.g., an unmanned aerial vehicle (UAV)) or any other manned or unmanned aerial vehicle or system. The aircraft propulsion system 10 of FIG. 1 includes a bladed propulsor rotor 12 and an aircraft powerplant 14 configured to drive rotation of the propulsor rotor 12.

The propulsor rotor 12 is an air mover configured to propel air to generate, for example, aircraft thrust and/or aircraft lift. The propulsor rotor 12 includes a rotor base (e.g., a disk or a hub) and a plurality of propulsor rotor blades (e.g., airfoils, vanes, etc.) arranged circumferentially about and connected to the rotor base. The propulsor rotor 12 may be an open (e.g., un-ducted) propulsor rotor or a ducted propulsor rotor. Examples of the open propulsor rotor include a propeller rotor for a turboprop propulsion system, a propfan rotor for a propfan propulsion system, a pusher fan rotor for a pusher fan propulsion system, and a rotorcraft rotor (e.g., a main helicopter rotor) for a turboshaft propulsion system. An example of the ducted propulsor rotor is a fan rotor for a turbofan propulsion system. However, for ease of description, the propulsor rotor 12 and the aircraft propulsion system 10 are respectively generally described below as the propeller rotor and the turboprop propulsion system.

The aircraft powerplant 14 may be configured as a hybrid electric powerplant. The aircraft powerplant 14 of FIG. 1, for example, includes a heat engine 16 and an electric machine 18. The heat engine 16 and the electric machine 18 are operatively coupled to the propulsor rotor 12 and configured to (e.g., independently and/or in combination) drive rotation of the propulsor rotor 12. The aircraft powerplant 14 of FIG. 1, for example, includes a drivetrain 20 (e.g., a geartrain, a transmission, etc.) which operatively couples the heat engine 16 and the electric machine 18 to the propulsor rotor 12 in parallel. The present disclosure, however, is not limited to such an exemplary arrangement. The heat engine 16 and the electric machine 18, for example, may alternatively be operatively coupled with the propulsor rotor 12 in series. In another example, the electric machine 18 may be incorporated into the heat engine 16. Referring again to FIG. 1, the aircraft powerplant 14 also includes a cooling system 22 and a control system 24.

The heat engine 16 may be configured as or otherwise include an internal combustion (IC) engine. This internal combustion engine may be an intermittent combustion internal combustion engine or a continuous combustion internal combustion engine. Examples of the intermittent combustion internal combustion engine include a rotary engine (e.g., a Wankel cycle engine) and a reciprocating piston engine (e.g., an inline (I) engine, a V-engine or a W-engine). An example of the continuous combustion internal combustion engine is a gas turbine engine. The present disclosure, however, is not limited to such exemplary internal combustion engines nor to internal combustion engines in general. The heat engine 16, for example, may also or alternatively include one or more fuel cells, or the like. However, for ease of description, the heat engine 16 is generally described below as the intermittent combustion internal combustion engine.

Figure 2:
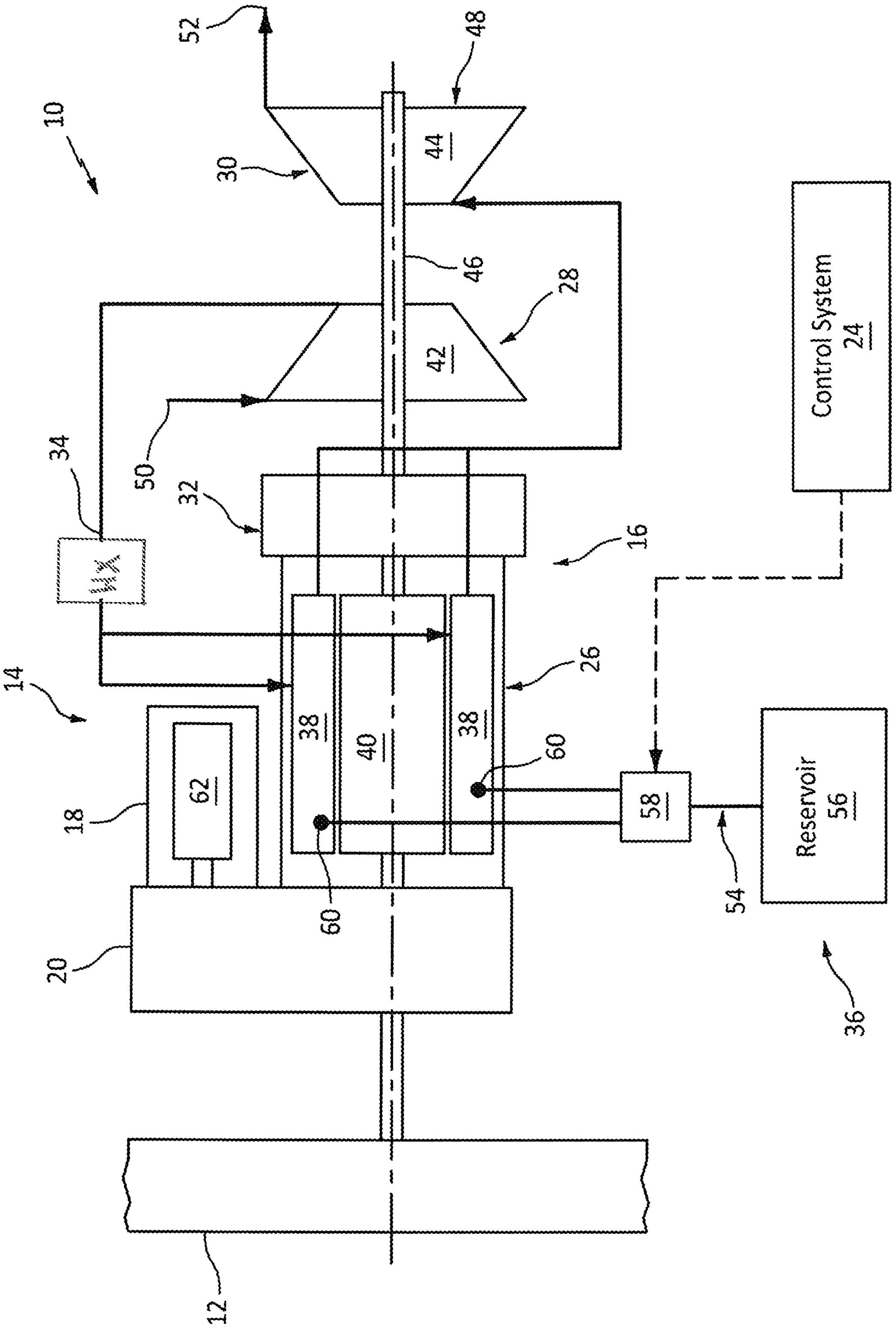
FIG. 2 is a schematic illustration of the aircraft propulsion system with a turbo-compounded internal combustion engine.

FIG. 2 illustrates an exemplary embodiment of the heat engine 16 as a turbo-compounded heat engine. This heat engine 16 of FIG. 2 includes an engine core 26, a compressor section 28, a turbine section 30 and a transmission 32; e.g., a gear system, a speed change device and/or a variable speed transmission. The heat engine 16 of FIG. 2 also includes an engine flowpath 34 and a fuel system 36.

The engine core 26 of FIG. 2 may be configured as, for example, the rotary engine or the reciprocating piston engine generally described above. This engine core 26 is configured to detonate (e.g., combust) a mixture of fuel and air within one or more combustion zones 38. Each combustion zone 38 may be configured as or otherwise include a combustion chamber, a piston bore and/or the like within the engine core 26 and, more generally, the heat engine 16. The detonation of the fuel-air mixture within the combustion zones 38 drives rotation of an internal engine rotating assembly 40 of the engine core 26 and, more generally, the heat engine 16. This engine rotating assembly 40 may include one or more pistons and/or rotors in and/or along the combustion zones 38, and is rotatable about an engine axis.

The compressor section 28 includes a bladed compressor rotor 42. This compressor rotor 42 may be configured as a radial flow compressor rotor; e.g., an axial inflow-radial outflow compressor rotor, a centrifugal compressor rotor, a compressor impeller, etc. Alternatively, the compressor rotor 42 may be configured as an axial flow compressor rotor; e.g., an axial inflow-axial outflow compressor rotor. The compressor rotor 42 of FIG. 2 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to (e.g., formed integral with or mechanically fastened, welded, brazed and/or otherwise attached to) and projects radially out from the compressor rotor base. The compressor rotor 42 is rotatable about a compressor axis.

The turbine section 30 includes a bladed turbine rotor 44. This turbine rotor 44 may be configured as a radial flow turbine rotor; e.g., a radial inflow-axial outflow turbine rotor, a centrifugal turbine rotor, a turbine wheel, etc. Alternatively, the turbine rotor 44 may be configured as an axial flow turbine rotor; e.g., an axial inflow-axial outflow turbine rotor. The turbine rotor 44 of FIG. 2 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to (e.g., formed integral with or mechanically fastened, welded, brazed and/or otherwise attached to) and projects radially out from the turbine rotor base. The turbine rotor 44 is rotatable about a turbine axis, which turbine axis may be parallel (e.g., coaxial) with the compressor axis.

The turbine rotor 44 may be coupled to the compressor rotor 42 through a turbo-compressor shaft 46. At least (or only) the compressor rotor 42, the turbine rotor 44 and the turbo-compressor shaft 46 may collectively form a turbo-compressor rotating assembly 48; e.g., a spool. This turbo-compressor rotating assembly 48 and its turbine rotor 44 are operatively coupled to and rotatable with the engine rotating assembly 40 through the transmission 32. The engine rotating assembly 40 may be operatively coupled to and rotatable with the propulsor rotor 12 (e.g., independent of the electric machine 18) through the drivetrain 20. With such an arrangement, the turbo-compressor rotating assembly 48 may rotate at a different rotational velocity than the engine rotating assembly 40. Similarly, the engine rotating assembly 40 may rotate at a different rotational velocity than the propulsor rotor 12.

The engine flowpath 34 of FIG. 2 longitudinally extends sequentially through the compressor section 28 (e.g., across the compressor rotor 42), the heat engine 16 (e.g., along/across the pistons and/or the rotors of the engine rotating assembly 40) and the turbine section 30 (e.g., across the turbine rotor 44) from an airflow inlet 50 into the engine flowpath 34 to a combustion products exhaust 52 from the engine flowpath 34. The flowpath inlet 50 may also be an airflow inlet into the aircraft powerplant 14. The flowpath exhaust 52 may also be a combustion products exhaust from the aircraft powerplant 14.

The fuel system 36 is configured to deliver fuel to the combustion zones 38 within the engine core 26 and, more generally, the heat engine 16. The fuel system 36 of FIG. 2, for example, includes a fuel circuit 54, a fuel reservoir 56, a fuel regulator 58 and one or more fuel injectors 60.

The fuel circuit 54 is fluidly coupled with an outlet of the fuel reservoir 56. This fuel circuit 54 extends longitudinally through the fuel regulator 58 to the fuel injectors 60. The fuel circuit 54 thereby fluidly couples the fuel reservoir 56 and its reservoir outlet to the fuel injectors 60 through the fuel regulator 58.

The fuel reservoir 56 is configured to store fuel before, during and/or after aircraft powerplant operation. The fuel reservoir 56, for example, may be configured as or otherwise include a tank, a cylinder, a pressure vessel, a bladder or any other type of fuel storage container.

The fuel regulator 58 is configured to selectively direct and/or meter a flow of the fuel from the fuel reservoir 56 to one or more of the fuel injectors 60. The fuel regulator 58, for example, may be configured as or otherwise include a fuel pump and/or a valve (or valve system).

The fuel injectors 60 are arranged with (e.g., on, along, in, etc.) the combustion zones 38. These fuel injectors 60 are configured to direct (e.g., inject) the fuel into the combustion zones 38 to mix with compressed air for subsequent combustion.

During operation of the heat engine 16, the fuel system 36 delivers (e.g., injects) fuel into the combustion zones 38. The fuel is mixed with compressed air within the combustion zones 38. This fuel-air mixture is ignited, and combustion products generated therefrom drive rotation of the engine rotating assembly 40. The rotation of the engine rotating assembly 40 drives rotation of the propulsor rotor 12 through the drivetrain 20, and the rotating propulsor rotor 12 generates aircraft thrust and/or lift. The combustion products further flow out of the engine core 26 into the turbine section 30 and drive rotation of the turbine rotor 44. The rotation of the turbine rotor 44 drives rotation of the compressor rotor 42, and the rotating compressor rotor 42 compresses air entering the aircraft powerplant 14 and its engine flowpath 34 through the flowpath inlet 50 to provide the compressed air to the heat engine 16. The rotation of the turbine rotor 44 also drives rotation of (e.g., boosts mechanical power to) the engine rotating assembly 40 through the transmission 32. The rotation of the turbine rotor 44 may thereby also drive rotation of (e.g., boost mechanical power to) the propulsor rotor 12 through the powerplant members.

Figure 3:
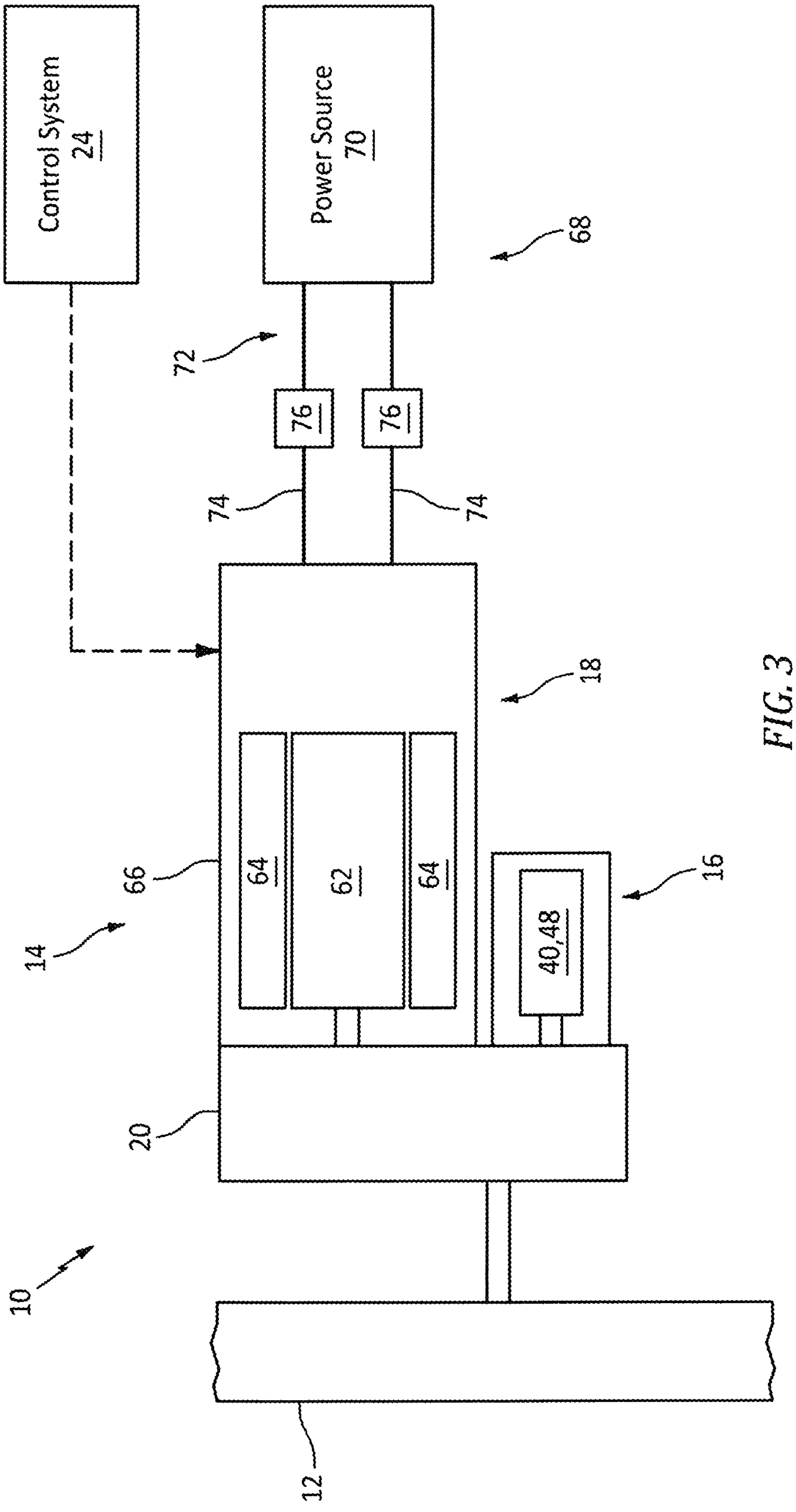
FIG. 3 is a schematic illustration of the aircraft propulsion system with an electric machine system.

Referring to FIG. 3, the electric machine 18 may be configured as an electric motor and/or an electric generator; e.g., a motor-generator. Alternatively, the electric machine 18 may be configured as a dedicated electric motor.

The electric machine 18 of FIG. 3 includes an electric machine rotor 62, an electric machine stator 64 and an electric machine housing 66. The machine rotor 62 is rotatable about a rotational axis of the machine rotor 62, which rotational axis may also be an axial centerline of the electric machine 18. The machine stator 64 of FIG. 3 is radially outboard of and circumscribes the machine rotor 62. With this arrangement, the electric machine 18 is configured as a radial flux electric machine. The electric machine 18 of the present disclosure, however, is not limited to such an exemplary rotor-stator configuration nor to radial flux arrangements. The machine rotor 62, for example, may alternatively be radially outboard of and circumscribe the machine stator 64. In another example, the machine rotor 62 may be axially next to the machine stator 64 configuring the electric machine 18 as an axial flux electric machine. Referring again to FIG. 3, the machine rotor 62 and the machine stator 64 are at least partially or completely housed within the machine housing 66.

The machine rotor 62 may be operatively coupled to and rotatable with the propulsor rotor 12 (e.g., independent of the heat engine 16) through the drivetrain 20. With such an arrangement, the machine rotor 62 may rotate at a different rotational velocity than the propulsor rotor 12.

During a motor mode of operation, the electric machine 18 operates as the electric motor to convert electricity received from a power system 68 into mechanical power. The machine stator 64, for example, may generate an electromagnetic field with the machine rotor 62 using the electricity. The electromagnetic field may drive rotation of the machine rotor 62, and the machine rotor 62 may drive rotation of one or more powerplant components (e.g., 12, 40) operatively coupled thereto through, for example, the drivetrain 20. During the motor mode of operation, mechanical power output by the electric machine 18 may be utilized for various purposes. For example, the electric machine mechanical power may boost mechanical power output by the heat engine 16 for driving rotation of the propulsor rotor 12. In another example, the electric machine mechanical power may completely power rotation of the propulsor rotor 12 and/or rotation of the engine rotating assembly 40 (see FIG. 2); e.g., during startup of the heat engine 16. Of course, the heat engine 16 may completely power rotation of the propulsor rotor 12 during other modes of operation.

During a generator mode of operation, the electric machine 18 operates as the electric generator to convert mechanical power into electricity. For example, the heat engine 16 and its engine rotating assembly 40 (see FIG. 2) may drive rotation of the machine rotor 62 through the drivetrain 20. The rotation of the machine rotor 62 may generate an electromagnetic field with the machine stator 64. The machine stator 64 may convert energy from the electromagnetic field into the electricity. The electric machine 18 may output this generated electricity to the power system 68 for further use; e.g., storage, provision to other aircraft components and/or systems, etc.

The power system 68 of FIG. 3 includes an electrical power source 70 and an electrical power bus 72. The power source 70 is configured to store electricity. The power source 70 is also configured to provide the stored electricity to the electric machine 18 and/or receive electricity from the electric machine 18. The power source 70, for example, may be configured as or otherwise include one or more electricity storage devices; e.g., batteries, supercapacitors, etc. The power bus 72 electrically couples the power source 70 to the electric machine 18. The power bus 72, for example, may include one or more electrical lines 74; e.g., high voltage lines. Each electrical line 74 of FIG. 3 is electrically coupled to and extends between the power source 70 and the electric machine 18. Of course, the power system 68 may also include one or more additional electric devices 76 electrically coupled between the power source 70 and the electric machine 18 along one or more of the electrical lines 74. Examples of these electric devices 76 include, but are not limited to, switches, current regulators, converters, amplifiers, buffers and the like.

Referring to FIG. 1, the cooling system 22 is configured to dissipate a thermal load (e.g., a heat load) generated and output by the heat engine 16. The cooling system 22 of FIG. 1, for example, includes a heat exchanger 78 (e.g., a radiator), a cooling circuit 80, a flow regulator 82 (e.g., a pump and/or valve system) and coolant; e.g., a fluid such as lubricant (e.g., oil), glycol, etc. The cooling circuit 80 fluidly couples the heat exchanger 78 to the heat engine 16; however, it is contemplated the cooling circuit 80 may also or alternatively fluidly couple the heat exchanger 78 to the electric machine 18 and/or the drivetrain 20. The cooling circuit 80 also extends through the heat exchanger 78 and the heat engine 16. The flow regulator 82 is inline with the cooling circuit 80. The flow regulator 82 is configured to direct (e.g., circulate) the coolant through the cooling circuit 80 between the heat engine 16 and the heat exchanger 78. With this arrangement, heat energy from the heat load may be transferred from the heat engine 16 into the coolant. This heated coolant is directed by the cooling circuit 80 to the heat exchanger 78. The heat exchanger 78 transfers at least some or all of the heat energy from the coolant and into (e.g., ambient) air flowing through and/or along the heat exchanger 78, which air may be part of a passive flow based on aircraft speed, boosted by the propulsor rotor 12, etc. The cooled coolant is then directed by the cooling circuit 80 back to the heat engine 16 to absorb additional heat energy. The cooling system 22 may thereby cool the heat engine 16. More particularly, the cooling system 22 may extract the heat energy—the thermal load—from the heat engine 16 and then dissipate that heat energy into the air.

The control system 24 is in signal communication with (e.g., hardwired and/or wirelessly coupled to) the aircraft powerplant 14 and the cooling system 22. The control system 24 may be configured as an onboard engine controller; e.g., an electronic engine controller (EEC), an electronic control unit (ECU), a full-authority digital engine controller (FADEC), etc. The control system 24 may be implemented with a combination of hardware and software. The hardware may include a memory 84 and at least one processing device 86, which processing device 86 may include one or more single-core and/or multi-core processors. The hardware may also or alternatively include analog and/or digital circuitry other than that described above.

The memory 84 is configured to store software (e.g., program instructions) for execution by the processing device 86, which software execution may control and/or facilitate performance of one or more operations such as those described in the methods below. The memory 84 may be a non-transitory computer readable medium. For example, the memory 84 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
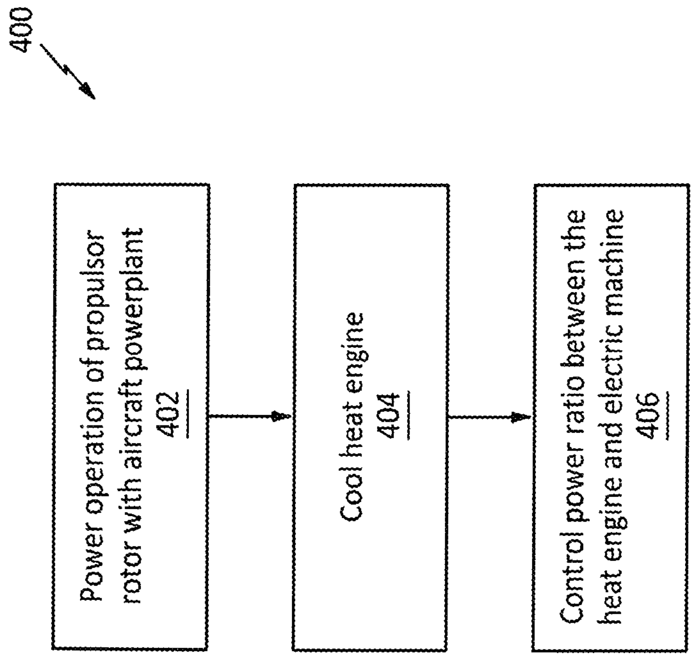
FIG. 4 is a flow diagram of a method for operating an aircraft powerplant.

FIG. 4 is a flow diagram of a method 400 for operating an aircraft propulsion system. For ease of description, the operating method 400 is described below with respect to the aircraft propulsion system 10 of FIG. 1 and its heat engine 16 of FIG. 2 and its electric machine 18 of FIG. 3. The operating method 400 of the present disclosure, however, is not limited to such an exemplary arrangement.

In step 402, the aircraft powerplant 14 is operated to output mechanical power ("powerplant power") for powering operation of the propulsor rotor 12 and, more particularly, driving rotation of the propulsor rotor 12. At least a portion (or an entirety) of the powerplant power ("engine power") may be supplied to the propulsor rotor 12 through the drivetrain 20 by the heat engine 16 as described above. In addition or alternatively, at least a portion (or an entirety) of the powerplant power ("machine power") may be supplied to the propulsor rotor 12 through the drivetrain 20 by the electric machine 18 operating as the electric motor as described above. The powerplant power may thereby be characterized by a ratio of the engine power to the machine power ("power ratio")—a power ratio for the aircraft powerplant 14. This power ratio may range from 100:0 (where the engine power accounts for 100 percent of the powerplant power) to 0:100 (where the machine power accounts for 100 percent of the powerplant power), as well as to select number or an infinite number of intermediate levels therebetween; e.g., 75:25, 50:50, 25:75, etc.

In step 404, the cooling system 22 is operated to cool the heat engine 16. For example, the cooling system 22 is operated to dissipate the thermal load generated and output by the heat engine 16 into the air using the heat exchanger 78.

The heat engine 16 generates the thermal load during the combustion of the fuel-air mixture. This thermal load is related to the mechanical power output of the heat engine 16. For example, when the heat engine 16 is throttled up to output additional mechanical power to the propulsor rotor 12, the fuel system 36 injects additional fuel into the combustion zones 38 for combustion. The combustion of additional fuel increases the temperature of the combustion products within the engine flowpath 34 and, thus, the temperature of various heat engine components lining the engine flowpath 34 or otherwise thermally coupled thereto. In another example, when the heat engine 16 is throttled down to output less mechanical power to the propulsor rotor 12, the fuel system 36 injects less fuel into the combustion zones 38 for combustion. The combustion of less fuel decreases the temperature of the combustion products within the engine flowpath 34 and, thus, the temperature of various heat engine components lining the engine flowpath 34 or otherwise thermally coupled thereto.

Under normal operating conditions, the cooling system 22 may be sized with a cooling capacity that meets or exceeds cooling requirements of the heat engine 16 during aircraft flight; e.g., aircraft climb, aircraft cruise and/or aircraft descent. The cooling system 22 may thereby be capable of (e.g., fully) dissipating the thermal load output by the heat engine 16 whether the heat engine 16 is operating at a low power setting (e.g., a low throttle position), an intermediate power setting (e.g., an intermediate throttle position), or a high power setting (e.g., a high throttle position) such as maximum engine power. The cooling capacity of the cooling system 22, however, is variable. For example, when a temperature of the air (e.g., ambient air temperature outside of the aircraft) is relatively low (e.g., cool), the cooling capacity of the cooling system 22 is relatively high. However, when the air temperature is relatively high (e.g., hot), the cooling capacity of the cooling system 22 is relatively low. In another example, when a speed of the air flowing through and/or along the heat exchanger 78 is relatively high (e.g., fast), the cooling capacity of the cooling system 22 is relatively high. However, when the air speed is relatively low (e.g., slow), the cooling capacity of the cooling system 22 is relatively low. Moreover, the air speed may be influenced by various factors such as an airspeed of the aircraft, a ground speed of the aircraft, a rotational velocity of the propulsor rotor 12 (e.g., where the heat exchanger 78 is downstream of the propulsor rotor 12), etc. Therefore, when the aircraft is on ground stationary, taxiing and/or (e.g., initially) accelerating for takeoff (e.g., a rolling takeoff), the cooling capacity of the cooling system 22 may be relatively low since the air speed is relatively low and/or the temperature is relatively high (particularly compared to ambient air temperature at cruise altitude). Under such conditions, the cooling capability of the cooling system 22 may be less than the thermal load output by the heat engine 16 while operating at its high power setting, its intermediate power setting or even at its low power setting (e.g., idle) under certain conditions.

In step 406, the power ratio may be controlled based on the cooling capacity of the cooling system 22. For example, the propulsor rotor 12 may need a certain amount of mechanical power during a certain mode of operation; e.g., aircraft taxiing, (e.g., initially) accelerating for takeoff (e.g., a rolling takeoff), etc. To fulfill this power demand with (e.g., only) the heat engine 16, the heat engine 16 may need to be operated at a first power setting. However, the thermal load to be outputted from the heat engine 16 to regulate an operational temperature (e.g., a combustion products temperature, a component temperature, etc.) of the heat engine 16 within specification while operating at the first power setting may be higher than the cooling capacity of the cooling system 22. Thus, in this example, the cooling system 22 cannot meet the cooling demand for the heat engine 16. Therefore, the power ratio may be decreased such that the heat engine 16 operates at a second power setting less than the first power setting. This second power setting is selected such that the thermal load to be outputted from the heat engine 16 to regulate the operational temperature of the heat engine 16 within specification is equal to or less than (e.g., by a safety factor) the cooling capacity of the cooling system 22. In other words, the power setting of the heat engine 16 may be lowered to a level where the cooling capacity of the cooling system 22 meets or exceeds the cooling demand of the heat engine 16. By contrast, the electric machine 18 is operated as the electric motor to boost (or completely supply) the mechanical power to the propulsor rotor 12. The electric machine 18 may thereby make up for the lower power setting of the heat engine 16 to ensure the propulsor rotor 12 is properly powered for operation. By contrast, when the cooling capacity of the cooling system 22 is relatively high, the power ratio may be increased even to a level where the heat engine 16 is providing full power to the propulsor rotor 12 and the electric machine 18 is non-operational (at least as the electric motor).

By maintaining the thermal load output by the heat engine 16 at or below the cooling capacity of the cooling system 22, the operational temperature of the heat engine 16 may be regulated. Thus, the power ratio may also or alternatively be controlled to maintain the operational temperature of the heat engine 16 within specification. For example, to decrease the operational temperature of the heat engine 16, the power level of the heat engine 16 may be decreased thereby decreasing the power ratio. Here, the power level of the electric machine 18 is conversely increased. In another example, to increase the operational temperature of the heat engine 16 (or accommodate an increase), the power level of the heat engine 16 may be increased thereby increasing the power ratio. Here, the power level of the electric machine 18 is conversely decreased. The operational temperature may be regulated to maintain the operational temperature within a temperature range, the bounds of which may be constant or variable based on one or more other operational parameters. In another example, the operational temperature of may be regulated to maintain the operational temperature at (e.g., equal to) or below (e.g., by a safety factor) a threshold, which threshold may be constant or variable based on one or more other operational parameters.

With the foregoing operability, the electric machine 18 may be selectively operated to facilitate provision of an optimized cooling system. In other words, the cooling system 22 may be optimized for stages of powerplant operation at which the aircraft powerplant 14 spends the most time; e.g., during aircraft flight versus on ground operation. By contrast, if the electric machine 18 was only used during flight, then the cooling system 22 may need to be configured with a greater cooling capacity. This may increase cooling system coolant flow requirements, size, weight, drag and/or cost.

While the step 406 is described above as varying the power ratio, it is contemplated the engine power and/or the machine power may be otherwise varied to manage the thermal load of the heat engine 16 and/or regulate the operational temperature of the heat engine 16. For example, the engine power and the machine power may alternatively be proportionally increased or decreased as needed. Thus, the power ratio may remain uniform; e.g., the same.

In some embodiments, the step 406 may be manually selected by an aircraft pilot. In other embodiments, the step 406 may be automatically selected as needed by the control system 24. Moreover, when the cooling capacity of the cooling system 22 is operable to meet cooling demand of the heat engine 16 even when the heat engine 16 is operated to deliver full powerplant power (e.g., when the electric machine 18 is non-operational at least as the electric motor), then the performance of the step 406 may be discontinued in favor of one or more other control strategies. For example, during aircraft flight, the heat engine 16 may alternatively be operated at its most efficient power level, and the electric machine 18 may be selectively operated as the electric motor when needed to provide additional powerplant power; e.g., for a maneuver, aircraft climb, etc. A temporary override may be provided to facilitate operation at a condition where thermal energy production is greater than cooling capacity to provide, for example, boosted (e.g., emergency) power.

While the performance of the step 406 is generally described above with respect to operation of the aircraft powerplant 14 while the aircraft is on ground, the performance of the step 406 is not limited on ground operation. The power ratio, for example, may continue to be controlled based on the cooling capacity of the cooling system 22 and/or to regulate the operation temperature of the heat engine 16 while the aircraft is in air flying. For example, the performance of the step 406 may be continued until the aircraft has reached a certain altitude, the ambient temperature is below a certain level, the power demand dips below a certain level, etc. Moreover, it is also contemplated the performance of the step 406 may also or alternatively be performed during aircraft descent and/or aircraft landing.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
driving rotation of a propulsor rotor of an aircraft using mechanical power output from a powerplant, the powerplant including a heat engine and an electric machine, the heat engine providing a first portion of the mechanical power, and the electric machine providing a second portion of the mechanical power;
regulating an operational temperature of the heat engine by controlling the first portion of the mechanical power generated by the heat engine and the second portion of the mechanical power generated by the electric machine; and
cooling the heat engine using a cooling system, the cooling system receiving a thermal load from the heat engine;
wherein the first portion of the mechanical power generated by the heat engine and the second portion of the mechanical power generated by the electric machine are further controlled to maintain the thermal load at or below a cooling capacity of the cooling system;
wherein the regulating the operational temperature of the heat engine comprises:
determining, at the operational temperature, a demand of the mechanical power;
determining, at a first power setting to meet the demand of the mechanical power, a first thermal load to be output from the heat engine is greater than the cooling capacity of the cooling system;
determining a second power setting of the heat engine such that the first portion of the mechanical power generated by the heat engine is decreased and a second thermal load to be output from the heat engine is less than the cooling capacity of the cooling system; and
increasing the second portion of the mechanical power generated by the electric machine to meet the demand of the mechanical power.

2. The method of claim 1, wherein the regulating of the operational temperature comprises at least one of
increasing a ratio of the first portion of the mechanical power generated by the heat engine to the second portion of the mechanical power generated by the electric machine to increase the operational temperature; or
decreasing the ratio of the first portion of the mechanical power generated by the heat engine to the second portion of the mechanical power generated by the electric machine to decrease the operational temperature.

3. The method of claim 1, wherein the operational temperature is regulated to maintain the operational temperature within a temperature range.

4. The method of claim 1, wherein the operational temperature is regulated to maintain the operational temperature below a threshold.

5. The method of claim 1, wherein the regulating of the operational temperature is further performed while the aircraft is accelerating for takeoff.

6. The method of claim 1, wherein the heat engine comprises a gas turbine engine.

7. The method of claim 1, wherein the heat engine comprises a rotary engine.

8. The method of claim 1, wherein the heat engine comprises a fuel cell.

9. The method of claim 1, wherein the propulsor rotor comprises an open propulsor rotor.

10. The method of claim 1, wherein the propulsor rotor comprises a ducted propulsor rotor.

11. A method of operation, comprising:
driving rotation of a propulsor rotor of an aircraft using mechanical power output from a powerplant, the powerplant including a heat engine and an electric machine, the heat engine providing a first portion of the mechanical power, and the electric machine providing a second portion of the mechanical power;
operating a cooling system to dissipate a thermal load generated by and output from the heat engine while providing the first portion of the mechanical power; and
controlling the first portion of the mechanical power generated by the heat engine and the second portion of the mechanical power generated by the electric machine while the aircraft is taxiing based on a cooling capacity of the cooling system;
wherein controlling the first portion of the mechanical power generated by the heat engine and the second portion of the mechanical power generated by the electric machine comprises:
determining, at an operational parameter, a demand of the mechanical power;
determining, at a first power setting to meet the demand of the mechanical power, a first thermal load to be output from the heat engine is greater than the cooling capacity of the cooling system;
determining a second power setting of the heat engine such that the first portion of the mechanical power generated by the heat engine is decreased and a second thermal load to be output from the heat engine is less than the cooling capacity of the cooling system; and
increasing the second portion of the mechanical power generated by the electric machine to meet the demand of the mechanical power.

12. The method of claim 11, wherein the cooling capacity of the cooling system increases as a rotational velocity of the propulsor rotor increases.

13. The method of claim 11, wherein the cooling capacity of the cooling system increases as a ground speed and/or an airspeed of the aircraft increases.

14. The method of claim 11, wherein a ratio of the first portion of the mechanical power generated by the heat engine to the second portion of the mechanical power generated by the electric machine is controlled to maintain the thermal load at or below the cooling capacity.

15. The method of claim 11, wherein a ratio of the first portion of the mechanical power generated by the heat engine to the second portion of the mechanical power generated by the electric machine is controlled to regulate an operational temperature of the heat engine.

16. The method of claim 11, further comprising controlling the first portion of the mechanical power generated by the heat engine and the second portion of the mechanical power generated by the electric machine while the aircraft is accelerating for takeoff based on the cooling capacity of the cooling system.

* * * * *